SAMUEL NATELSON
INVENTOR.

BY George B. Oujevolk attorney

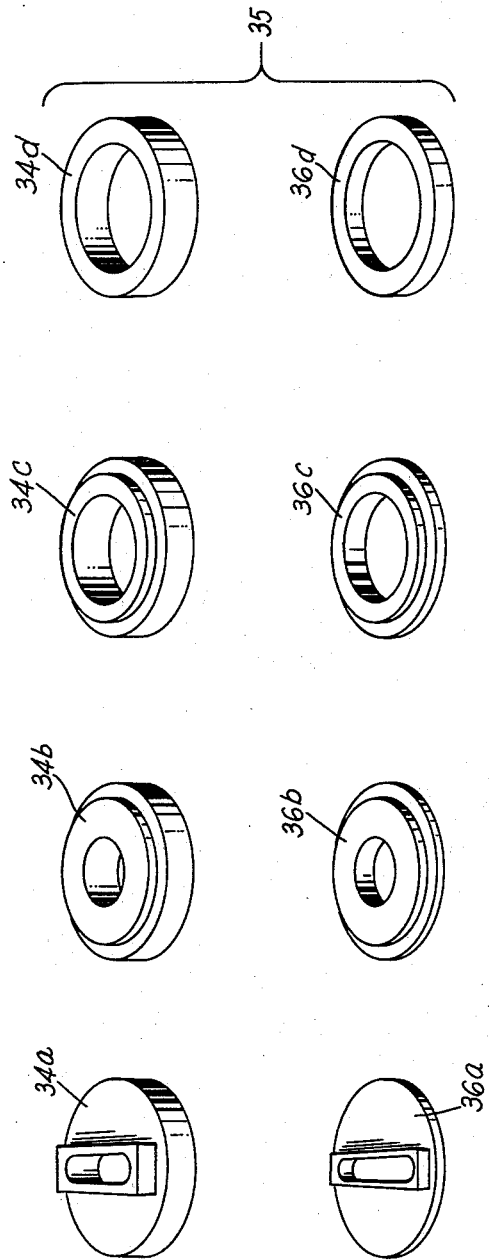

United States Patent Office 3,192,990
Patented July 6, 1965

3,192,990
FILM TYPE LIQUID CONCENTRATION
APPARATUS
Samuel Natelson, 15 Parkwold Drive W.,
Valley Stream, N.Y.
Filed Sept. 4, 1962, Ser. No. 221,171
7 Claims. (Cl. 159—5)

The present invention relates to a liquid concentration apparatus, and more particularly to a ring oven-type of liquid concentration apparatus used to determine traces of a substance in a large quantity of a sample.

Ring ovens in the past have been used for analyzing the composition of a spot. In this technique, a spot is placed on paper and allowed to dry. Analysis of the spot is then made by dropping a reagent into the center of the spot and allowing this to dry. Solvent in the form of sequential drops is now dropped in the center causing the solvent to move outward. The various ingredients are now driven out from the center by a process similar to paper chromatography. The paper is set on a ring oven at relatively low temperatures of between 37° C. to 60° C. to limit the flow of solvent. The different components now appear as a series of rings radiating out of the center with the fastest component being on the outside.

Trace analysis is the determination of a trace of a substance in a large quantity of sample. In an article of the March 1961 issue of Analytical Chemistry, on pages 396 to 401, the present inventor demonstrated how ring ovens could be used successfully in trace analysis. Here the ring oven is not used in its usual way to separate out the different components of the sample by forming rings, but on the contrary, the sample is concentrated in one spot forming a coherent concentration of the sample.

The particular application of the device described in the aforesaid article in "Analytical Chemistry" was in the determination of strontium in human serum and bone. Although this oven with the central cooling means solved the problem for that particular analysis, a more universal ring oven is required for general use. After a concentrated spot has been obtained on the filter paper, additional processing may be required for the determination. Thus, the components of the concentrated spot may have to be separated, e.g., by electrophoresis so that the spot should preferably be a stripe. Also, the spot must be properly sized to present to different types of reading means or for further processing. The temperature must be properly controlled for various applications. Heretofore, none of the ring ovens available have had general or universal application. All were suitable only for one particular type of analysis.

The present invention is directed to a ring oven which has general application and can form coherent spots of various sizes and shapes for further processing of the sample.

Therefore, an object of the present invention is to provide a ring oven which will present uniform spots.

Another object of the present invention is to provide a ring oven which can be used for a plurality of applications.

Still another object of the present invention is to provide a ring oven useful in trace analysis.

The invention will appear more clearly from the following detailed description when taken in connection with the accompanying drawing, showing by way of example, preferred embodiments of the inventive idea, in which.

Figure 1:
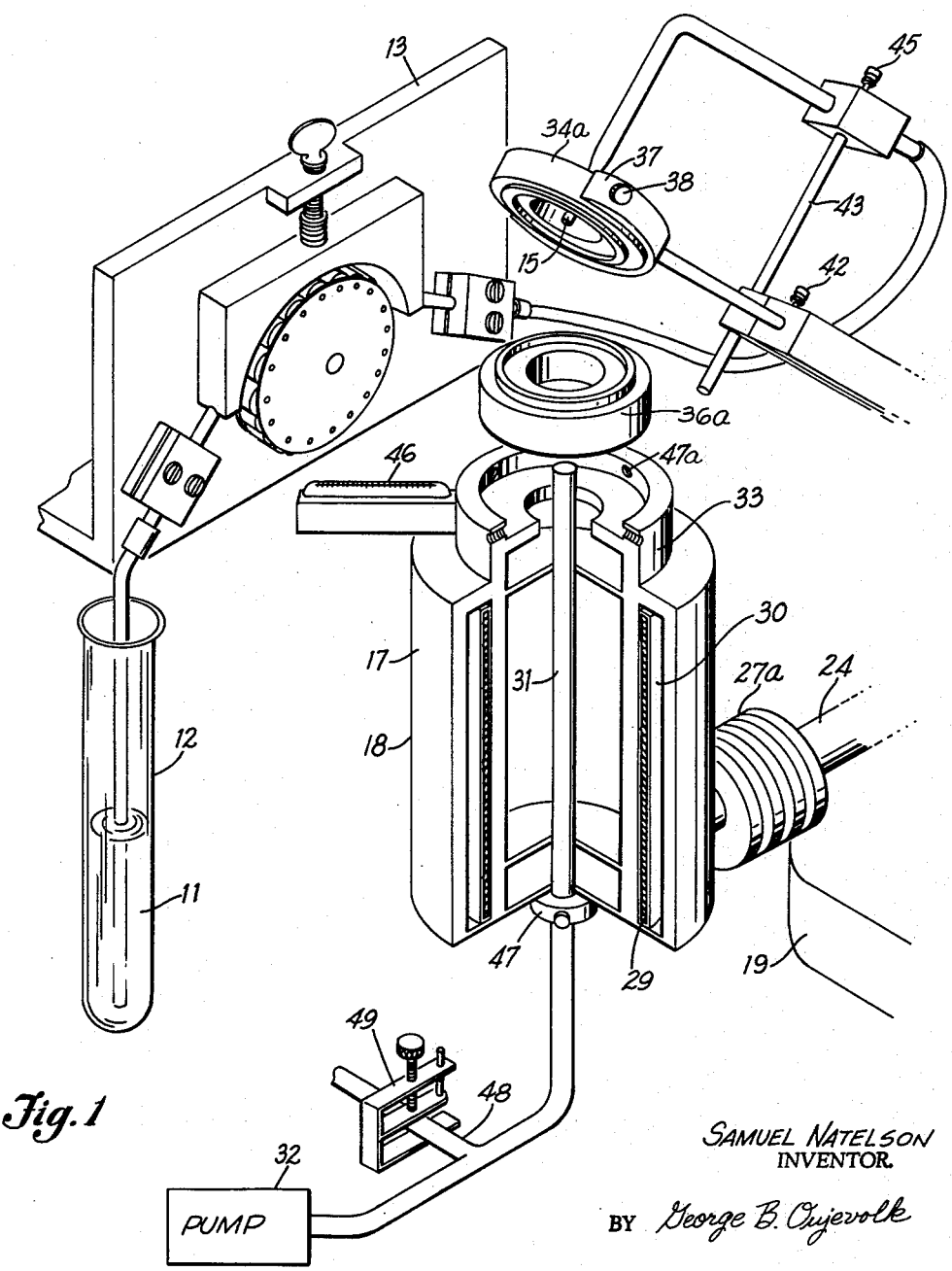
FIG. 1 is a partly cut, partly exploded and partly perspective explanation of the operation of the ring oven assembly contemplated herein.

Generally speaking, the present invention contemplates a ring oven which will include a neck; cooling means passing through said ring oven to a location in the neck; spot defining means having a lower member designed to be retained by said neck and an upper member designed to be placed over said lower member to hold a flat medium thereinbetween; and, clamp means retaining said upper member against said lower member firmly holding said flat medium thereinbetween. An important feature of the instrument contemplated in the present invention is the fact that the spot defining means are readily interchangeable. This permits the precise definition of the size and shape of the spot and also permits the removal of the rings for the purpose of cleaning and scrubbing. This is of prime importance because in trace analysis, minute amounts of previous sample left on the spot defining means can interfere with the proper determination of the test conducted. A further advantage is that spot defining means of different composition can be used. Thus, if one is doing aluminum analysis, one may use stainless steel spot defining means whereas for iron analysis, one would use aluminum spot defining means. The spot defining means can be plated with gold or platinum, a thin coating of which is relatively inexpensive but effective for preventing interference from the material below the plating coat.

In the drawing, the sample to be analyzed is in a solution 11 placed in a container 12 designed for adding and controlling drop addition to filter paper. From this container, feeding means 13 feeds the sample to an elbow tube 14 having a capillary tip 15 designed to deposit sample drops on filter paper 16. This may take the form of whatman 3-mm. paper obtained in rolls 1½ inches wide and cut into suitable lengths. This filter paper 16 is held in a neck 33 at the top of a ring oven 17. Ring oven 17 has a cylindrical bottom section 18 and is supported upright by central support means which includes a stand 19 having a central upright support rod 20. Slidably mounted on support rod 20 is a center boss 21 which can move up and down the rod and may be fixed at any position on the rod by means of a screw arrangement 22. Support rod 20 will preferably have a flat axial portion 23 so that the screw can firmly grip the rod and hold its position. Set in the boss 21 at right angles to the center rod is a first support 24 designed to hold the bottom section 18 of ring oven 17. Axially aligned with first support 24 is a second support 25 designed to hold the temperature control means 26 for the ring oven. This temperature control will have the usual temperature control knob 26a graduated in degrees of temperature as desired. A lead 27 to the power source feeds the power to the temperature control means 26. First support 24 supports heat vanes 27a, and from the temperature control means 26 is a heater circuitry going to the inside wall of the ring oven including heating coils 29 encased in asbestos layers 30. For the purpose of the present invention, the heater circuitry provides temperatures usually in excess of 100° C., preferably between 100° C. to 160° C. if filter paper is used and up to 250° C. if other materials are used. Passing axially through the ring oven is a cooling tube 31 having an outer tube portion leading to a pump 32. Usually the tube acts as an aspirator and the pump as a suction pump. The inner portion of tube 31 will terminate in the neck 33 at the top of the ring oven just under filter paper 16 which is retained by the apparatus as will be herein explained. The action of this tube when used as an aspirator should be particularly noted since normally if a drop of solution is placed on warmed paper, it will evaporate. A second drop will redissolve the residue and move it outward from the center of the paper. If this is continued, a clear center will be obtained with a ring around it, the highest concentration being in the outer ring. It is this principle which is used in the conventional ring oven techniques. This is caused by the tendency of the solution to move to the coolest area. To obtain a uniform residue, it is necessary to keep the area defined by tube 31 at the lowest temperature. Therefore the above described arrangement with proper pump action will keep a portion of the paper cooler than its surroundings. This drives the solution to this defined cooler portion.

Figure 2:
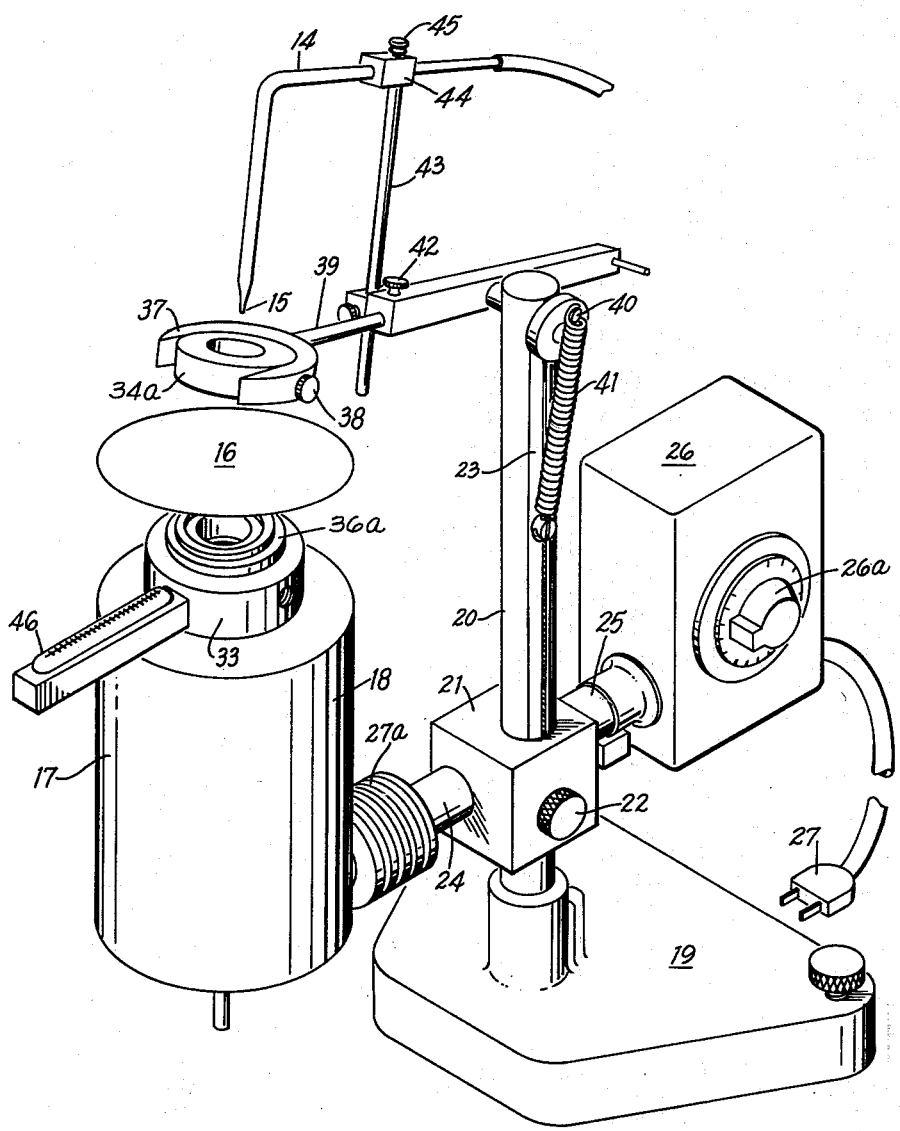
FIG. 2 is a perspective view of a fully assembled ring oven assembly illustrated in FIG. 1 showing the position of the filter paper thereon in a partially exploded view; and, FIG. 3 illustrates some of the ring sets contemplated in the device of FIG. 1.

As shown in FIGURE 1, the ring oven of the apparatus of the present invention is designed to cause the evaporation of drops of liquid deposited by elbow tube 14 on filter paper 16 so as to form a spot capable of being analyzed. To this end, neck 33 acts as the retaining means for the lower member of spot defining means 35. Some of these spot defining means 35 are depicted in the drawing. Thus, the set consisting of upper and lower members 34a and 36a will form a stripe useful in further processing by electrophoresis, while sets 34b, 36b; 34c, 36c; 34d, 36d will form various sizes of circular spots. A lower member 36 of the set 35 is inserted in the neck 33 and retained therein by small screws. The action of the tube 30 because of its position just under this lower member is such that it will maintain cool the spot formation defined by this lower member. The upper member is gripped in a half-ring 37 sized so that the upper member will fit therein having screw means 38 to firmly grip the upper member in the half-ring. The half-ring 37 is attached to the outer section of a retaining arm 39, the inner section of the retaining arm being pivotly mounted towards the top of central support rod 20. Retaining arm 39 is designed to maintain the half-ring and the upper member of the spot defining means in engagement with the neck 33 of the ring oven and the lower member of the spot defining means, clamping the filter paper therebetween. Because of the pivotal mounting, the retaining arm 39 can swing away from the ring oven so that the filter paper can be removed. As shown in FIGURE 2, the pivotal mounting includes an eccentric pin 40 so disposed that the pivoting of retaining arm 39 will move the pin to one side or the other side of central support rod 20. A spring 41 extends between the eccentric pin 40 and the central support rod so as to bias the retaining arm so that the upper and lower members tend to be either in engagement or out of engagement depending on the rotational position of the mounting means. Retaining arm 39 is adjustable by means of a screw 42 and likewise includes an elbow tube support 43 to support elbow tube 14 which delivers the sample solution and includes tube retaining means 44 with a clamp screw 45 to hold the tube. The instrument also includes a thermometer 46 which is positioned so as to measure the spot temperature at the neck of the ring oven. The position of cooling tube 31 may be adjusted by means of a screw adjustment 47 which is part of the retaining means holding the tube axially in the ring oven. Adjustable air vents 47a are provided in the neck of the tube.

The spot defining means upper member has a collar depth of .02 to 1 inch. This is because if the evaporation is carried out under an inert gas, i.e., N or $CO_2$, the gas is not aspirated but blown upwards gently through the paper and creates a blanket of gas above the paper in the collar. Therefore, evaporation takes place with the inert gas doing the cooling but in an atmosphere free of oxygen. When using the instrument in this manner, air vents 47a in the neck of the tube are closed by screw plugs. As an example, if a substance such as ferrous sulfate is evaporated, it will be air oxidized to ferric sulfate, whereas in an atmosphere of N or $CO_2$, it will remain in the ferrous state. The air pressure in the tube may be adjusted by means of a bleeder bypass 48 having adjustable means 49 to adjust the amount of air bled out of the tube.

It is to be observed therefore that the present invention provides for an improvement in a ring oven, and comprises in combination, central support means including a supporting rod 20 and a stand 19; ring oven and temperature control support means, i.e., first and second supports 24 and 25 coupled to said central support means; a ring oven 17 and temperature control means 26 supported thereby, said temperature control means controlling the temperature of said ring oven; central spot cooling means 31 and 32 passing through said ring oven to a location near the top thereof; a neck 33 at the top of said ring oven for retaining one member of spot defining means therein; a plurality of exchangeable spot defining means 35 having a lower member designed to be retained by said neck and an upper member designed to be placed over said lower member, said upper and lower members cooperating to hold filter paper 16 thereinbetween; and, an upper member half-ring grip means assembly 37, 39 and 40, pivoted to said central support means and including biasing means, i.e., a spring 41 tending to retain said upper and lower members either apart or together so as to hold said filter paper thereinbetween, or to release said filter paper.

Although the present invention has been described in conjunction with preferred embodiments, it is to be understood that modifications and variations may be resorted to without departing from the spirit and scope of the invention, as those skilled in the art will readily understand. Such modifications and variations are considered to be within the purview and scope of the invention and appended claims.

I claim:

1. A method of evaporating a liquid to yield a solid substance from a sample capable of being analyzed for trace elements; comprising the steps of defining a spot shape useful in the further processing of the sample, on a flat absorbent medium, heating the outer edge of this medium, cooling that portion of said medium under said defined spot shape, and having drops of the liquid fall in said defined spot shape, whereby successive drops are evaporated forming a coherent concentration of the substance sought.

2. A liquid concentration apparatus comprising in combination
   central upright support means;
   first and second supports extending laterally from said central upright support means;
   a cylindrical ring oven including a top and a bottom section which is supported upright by said first support connected to said bottom section;
   temperature control means supported by said second support including heating circuitry extending therefrom to said ring oven;
   cooling means including a tube with outer and inner portions, said inner tube portion extending axially through said ring oven towards the top thereof, said outer tube portion extending to the outside from said ring oven bottom section for coupling to a gas pump;
   a neck axially set in said ring oven top including fastening means therein for retaining a lower member of spot defining means therein; and,
   a retaining arm with inner and outer sections, grip means at said outer section for gripping an upper member of spot defining means, and pivot means at said inner section pivoted to said central upright support means, the pivotal movement of said retaining arm bringing said grip means into juxtaposition with said neck so that a flat medium can be held between a lower member of spot defining means held by said neck and an upper member gripped by said retaining arm outer section.

3. A device as claimed in claim 2 including feed means held by said retaining arm disposed so as to feed liquid between said grip means when the pivotal movement of said retaining arm brings said grip means into juxtaposition with said neck.

4. A device as claimed in claim 2 said central upright support means including a central upright support rod, said retaining arm pivot means being pivoted thereto, eccentric means coupled to said pivot means said eccentric means moving to one and the other side of said support rod as said arm is pivoted, spring means between said eccentric means and said support rod tending to hold said eccentric means towards the one and the other side of said support rod as said retaining arm is pivoted.

5. A device as claimed in claim 2, including a lower member of spot defining means held by the fastening means in said neck and an upper member gripped by said grip means.

6. A device as claimed in claim 5 including feed means held by said retaining arm disposed so as to feed liquid to said spot defining means when the pivotal movement of said retaining arm brings said upper and lower members into juxtaposition.

7. A device as claimed in claim 6 said feed means including a tube support mounted on said retaining arm for holding an elbow tube including adjustable positioning means for adjusting the position of a tube held therein; and, an elbow tube having a capillary tip held by said adjustable positioning means, which by adjustment can be disposed so that said tip is aligned over said spot defining means upper member.

References Cited by the Examiner
UNITED STATES PATENTS

| | | | |
|---|---|---|---|
| 2,192,248 | 3/40 | Veeder | 23—253 |
| 2,922,301 | 1/60 | Phelan et al. | 73—53 |
| 3,026,187 | 3/62 | Robertson | 23—259 X |

NORMAN YUDKOFF, *Primary Examiner.*

GEORGE D. MITCHELL, *Examiner.*